UNITED STATES PATENT OFFICE.

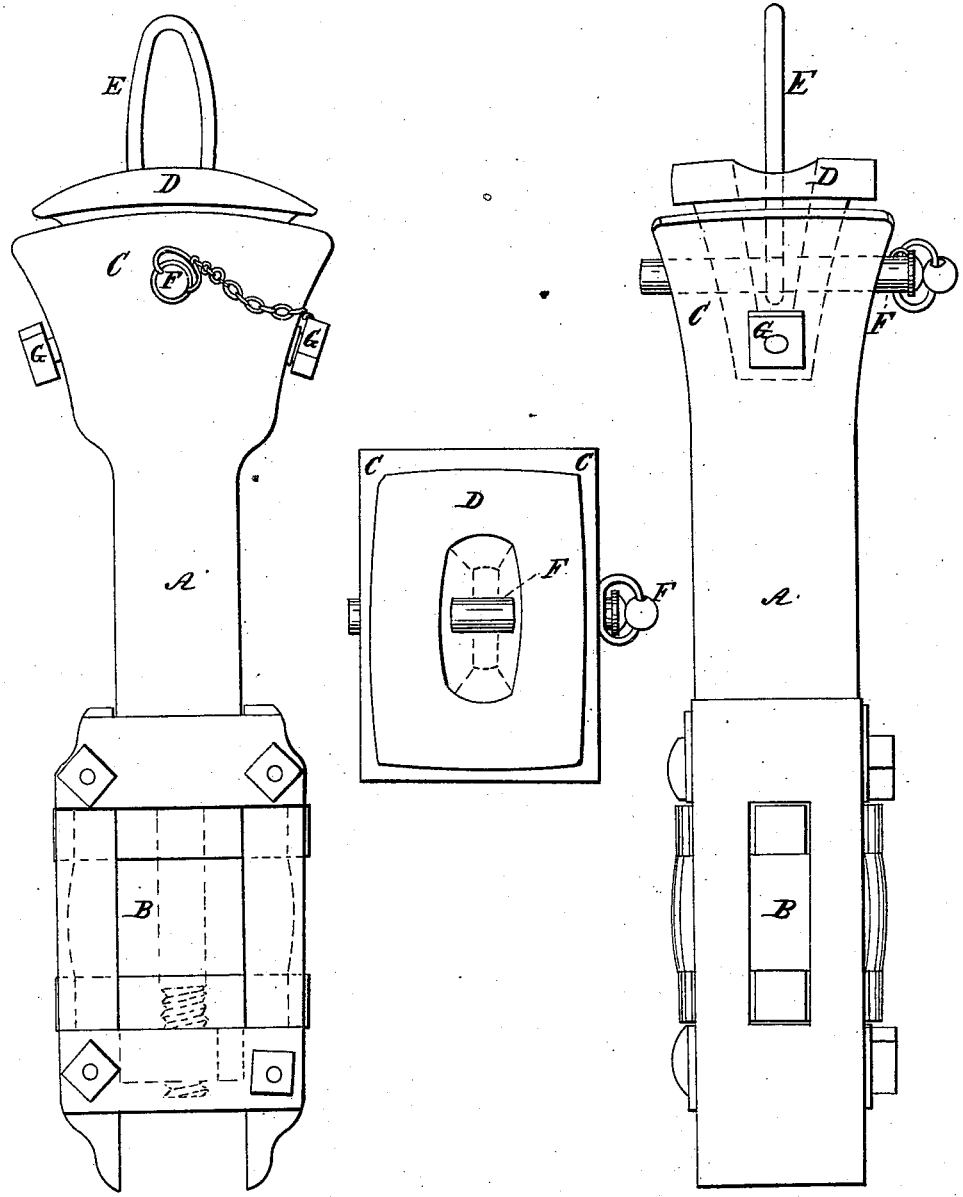

JOSEPH TANEY AND JOHN H. BROWN, OF BANGOR, MAINE.

IMPROVED RAILWAY-CAR BUMPER.

Specification forming part of Letters Patent No. 83,006, dated October 13, 1868.

*To all whom it may concern:*

Be it known that we, JOSEPH TANEY and JOHN H. BROWN, of Bangor, in the county of Penobscot, and in the State of Maine, have invented certain new and useful Improvements in Car-Bumpers; and we do hereby declare that the following is a full, clear, and exact description thereof, reference being had to the accompanying drawings, and to the letters of reference marked thereon.

The nature of our invention consists in a rubber spring inserted into the head of the draw-beam, giving additional elasticity to the draw-bar, so that all liability of breaking the transion-beam or center-pin is totally avoided, as well as the danger of breaking the head of the casting.

Nearly all bumpers now in use have the rubber spring at the end of the draw-bar, and with the addition of this spring into the head of said draw-bar there is so much elasticity that the sudden shock or jerk of the cars, which is so often experienced, is nearly totally avoided. It also prevents the rattling of the link in the head when the cars are crowded together on down-grades.

In order to enable others skilled in the art to make and use our invention, we will now proceed to describe its construction and operation, referring to the annexed drawings, which form a part of this specification, and in which—

Figure 1 is a plan view; Fig. 2, a side view, and Fig. 3 a front view.

A represents the draw-beam, provided, as usual, with a rubber spring, B, at its end. C represents the head of the draw-beam, into which a rubber spring, D, is inserted. This rubber spring is made of a solid piece of rubber, made to fit tight inside of the draw-head C, projecting in front thereof, and flanged outward on all sides, so as to nearly cover the whole front of the same. The center of the spring is cut out to admit the coupling-link E, and also cut to admit the pin or bolt F.

The spring D is secured to the draw-head by means of screws G G on the sides of the same.

Having thus fully described our invention, what we claim as new, and desire to secure by Letters Patent, is—

The rubber spring D, when constructed as described, and inserted into the draw-head C, substantially as and for the purposes herein set forth.

In testimony that we claim the foregoing we have hereunto set our hands this 1st day of June, 1868.

JOSEPH TANEY.
JOHN H. BROWN.

Witnesses:
    EDWIN LANDER,
    C. J. MASON.